H. EWING.
SELF PROPELLED VEHICLE.
APPLICATION FILED SEPT. 15, 1911.
1,089,121.
Patented Mar. 3, 1914.
2 SHEETS—SHEET 1.
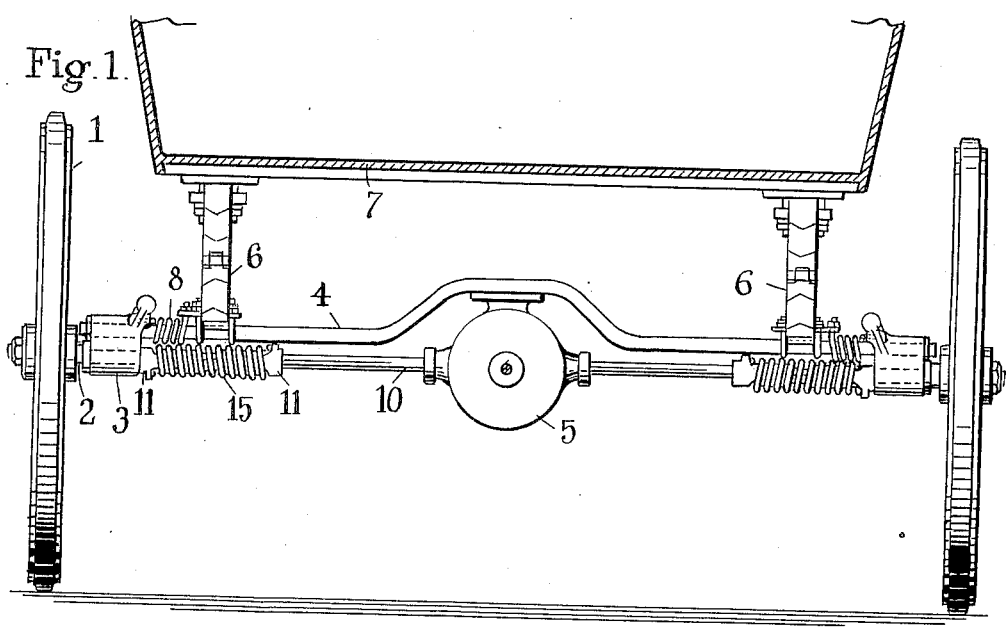
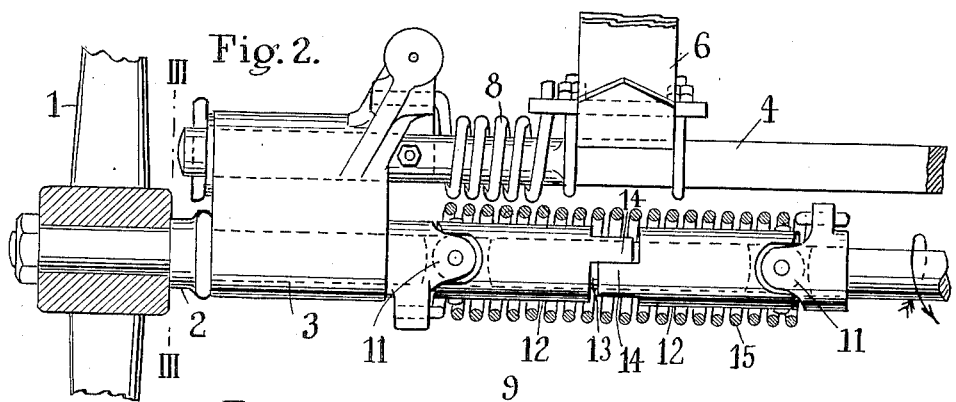
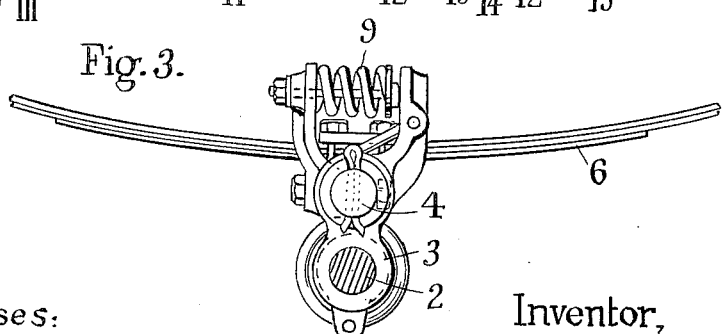
Witnesses:
Inventor,
Hugh Ewing,
by Thomas Ewing Jr
Attorney.
COLUMBIA PLANOGRAPH CO., WASHINGTON, D. C.

H. EWING.
SELF PROPELLED VEHICLE.
APPLICATION FILED SEPT. 15, 1911.

1,089,121.

Patented Mar. 3, 1914.
2 SHEETS—SHEET 2.

Witnesses:
Samuel W. Balch
James T. Law

Inventor,
Hugh Ewing,
by Thomas Ewing Jr
Attorney

UNITED STATES PATENT OFFICE.

HUGH EWING, OF COLUMBUS, OHIO.

SELF-PROPELLED VEHICLE.

1,089,121. Specification of Letters Patent. Patented Mar. 3, 1914.

Application filed September 15, 1911. Serial No. 649,413.

*To all whom it may concern:*

Be it known that I, HUGH EWING, a citizen of the United States of America, and a resident of Columbus, county of Franklin, and State of Ohio, have invented certain new and useful Improvements in Self-Propelled Vehicles, of which the following is a specification.

This invention relates to the introduction of elastic means in the power-transmitting devices between the engine or other source of power and the driving wheels.

The object of the invention is to protect the vehicle from jam or shock under a number of conditions. One of these is when the clutch is thrown on which connects the engine with the transmission. Another condition is when some obstruction tends to momentarily arrest the revolution of a driving wheel. This is particularly the case when a driving wheel supports the vehicle body through a spring-controlled wheel link such as is set forth in United States Letters Patent No. 951,000 and No. 951,096, granted to me March 1, 1910, and my invention is herein set forth in connection with mechanism of the general form and for the purpose set forth in the above mentioned patents.

Figure 4:
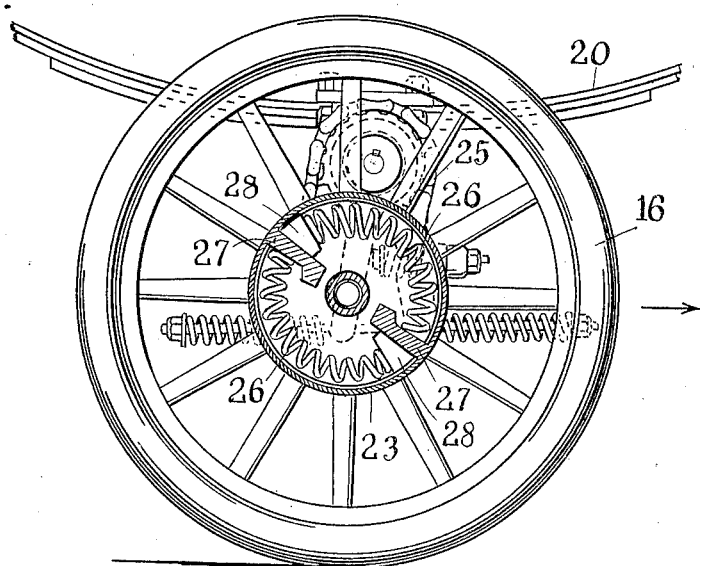
Figure 5:
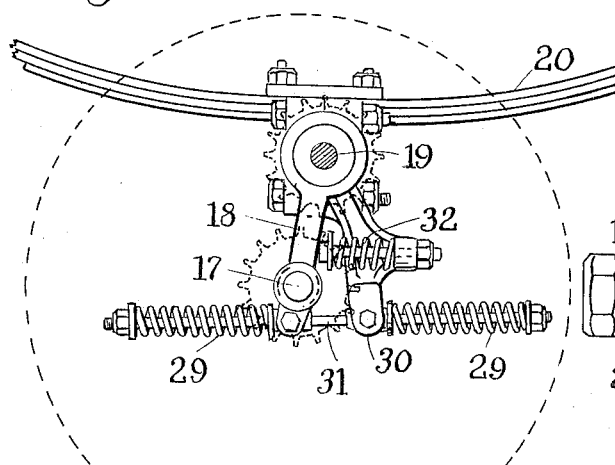
Figure 6:
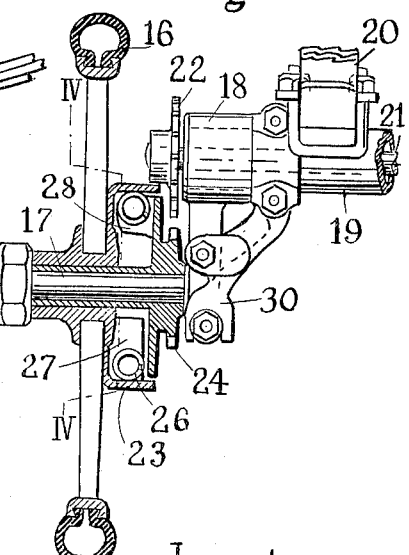

In the accompanying two sheets of drawings which form a part of this application—Figure 1 is a cross-section through an automobile embodying my invention looking rearwardly and showing the differential axle and driving wheels. Fig. 2 is an enlarged view of a portion of the same. Fig. 3 is a section on the line III—III of Fig. 2 showing the wheel link. Fig. 4 is a side elevation of a portion of an automobile embodying a modified form of my invention, the driving wheel hub being broken away on the line IV—IV of Fig. 6. Fig. 5 is a similar view with the driving wheel removed. Fig. 6 shows the same parts looking rearwardly, the driving wheel being in section.

In the form shown in Figs. 1, 2 and 3, a driving wheel 1 is made fast to a live axle 2. The axle is journaled in the lower end of a substantially vertical link 3 which is pivoted at its upper end to an axletree 4 which is supported through the link from the driving wheel. This axletree is curved at its middle to make room for a differential 5, the casing of which is attached to the axletree. Vehicle springs 6 6 are clamped to the axletree and support the vehicle body 7. The link is normally held in its substantially vertical portion against a rearward swing by a spring 8 which is coiled about the axletree. A buffer spring 9, Fig. 3, prevents the link from swinging forward from the vertical and serves to arrest it without jar on its return after it has been swung rearwardly. The rearward swinging of the link saves the vehicle from shock when the driving wheel encounters an obstruction. As the differential and other parts of the power transmission do not partake of this movement of the link a flexible connection is provided between a driving shaft 10 from the differential and the live axle journaled in the swinging link. This connection consists of universal joints 11 11 and the portion of shaft between the joints consists of tubular sections 12 12 held in line by a loose shaft 13 with which they are telescoped to provide adjustment for the extra distance when the link is swung out of line. This form of connection permits the axis of the driving wheel to remain parallel to its normal alinement when the link swings back. The two sections of the connecting shaft between the universal joints are connected by loosely engaging dogs 14 14 at the ends of the shaft sections in such manner as to permit the driving wheel to stop momentarily or revolve less rapidly in its forward direction or lag behind a fraction of a revolution. The location of the slip joint effect and torsional slackness at this point of the transmission is however not essential. The dogs are normally held in engagement, as shown, by the tension of a power transmission spring 15 the ends of which are connected respectively to the shaft from the differential and to the live axle journaled in the swinging link. This spring is tensioned so that it will normally transmit the drive except at the moment of starting the car and in climbing a steep hill. This keeps it in condition to absorb the power when an obstruction is encountered and lets the driving wheel of the vehicle stop turning while the link through which it is supporting the vehicle is swinging back. The forward drive is thus normally through the spring, and the universal joints and the telescoping parts are relieved of strain. In backing, the drive is entirely through these parts instead of through the spring. The above form of my invention is the more usual construction and is preferably followed when the length of link is suitable for the purpose for which the automobile is constructed.

In the form shown in Figs. 4, 5 and 6 a driving wheel 16 runs loosely on a stud 17 which projects from the lower end of a link 18. The link is pivoted at its upper end to the live axle casing 19 to which the vehicle spring 20 is clamped and which is supported from the driving wheel through the link. Power is communicated to the driving wheel through a live axle 21 which is journaled in its casing as in the usual construction. The live axle carries a sprocket wheel 22 at its extremity. The driving wheel has a drum 23 which may be an ordinary brake drum with its internal brake removed. On a loose sleeve which passes through the hub of the driving wheel is a sprocket 24 which is driven from the sprocket on the live axle through a chain 25. Within the drum of the driving wheel are power transmitting springs 26 26 which abut against dogs 27 27 attached to the drum and driving wheel, and dogs 28 28 attached to the sprocket wheel. The springs also hold these dogs in engagement with each other, the relation being such that the forward drive is transmitted through the springs which are sufficiently tensioned to normally transmit the power without compressing further and permitting the dogs to separate, but not tensioned so much but that they will temporarily absorb the power and permit the driving wheel to momentarily stop or slacken its speed without checking the live axle when the link is swinging back to permit passage of the wheel over an obstruction. The link is held in its normal position and controlled by springs 29 29 which abut against the link and an arm 30 which is clamped to the live axle casing. The outer ends of the link controlling springs are connected by a rod 31. The pivoted link is arrested on its return movement and held against forward movement by a buffer spring 32.

What I claim as new and desire to secure by Letters Patent of the United States, is—

1. In a self-driven vehicle, the combination of a driving wheel therefor, a wheel-axle, a body, a spring controlled-supporting link for the body carried upon the wheel-axle, said link being pivoted substantially vertically over the wheel-axle and normally maintained in said position by its spring control, driving mechanism in two sections one of which positively connects with the driving wheel, and a power transmission spring connecting the sections of the driving mechanism so as to absorb the power of the driving mechanism while permitting the driving wheel to be momentarily retarded in its revolution, substantially as described.

2. In a self-driven vehicle, the combination of a driving wheel therefor, a wheel-axle, a body, a supporting link for the body carried upon the wheel-axle, a spring for controlling the movement of the link upon its pivot, driving mechanism in two sections one of which positively connects with the driving wheel, and a power transmission spring connecting the sections of the driving mechanism so as to absorb the power of the driving mechanism while permitting the driving wheel to be momentarily retarded in its revolution, substantially as described.

3. In a self-driven vehicle, the combination of a driving wheel therefor, a wheel-axle, a body, a pivoted supporting link for the body carried upon the wheel-axle, a spring for controlling the movement of the link upon its pivot, driving mechanism in two sections which positively engage for rearward movement and one of which positively connects with the driving wheel, and a power transmission spring connecting the sections of the driving mechanism so as to hold the sections normally in engagement and to absorb the power of the driving mechanism while permitting the driving wheel to be momentarily retarded in its revolution, substantially as described.

4. In a self-driven vehicle, the combination of a driving wheel therefor, a wheel-axle, a body, a pivoted supporting link for the body carried upon the wheel-axle, a spring for controlling the movement of the link upon its pivot, driving mechanism including a driving shaft supported independently of the link and forming an extension of the wheel-axle, and flexible connections between the driving shaft and the wheel axle, substantially as described.

5. In a self-driven vehicle, the combination of a driving wheel therefor, a wheel-axle, a body, a pivoted supporting link for the body carried upon the wheel-axle, a spring for controlling the link upon its pivot, driving mechanism including a driving shaft in two sections forming an extension of the wheel-axle which positively engages for rearward movement and one of which positively connects with the driving wheel, flexible connections between the driving shaft and the wheel-axle, and a power transmission spring connecting the sections of the driving mechanism independently of the flexible connections so as to hold the sections normally in engagement and to absorb the power of the driving mechanism while permitting the driving wheel to be momentarily retarded in its revolution, substantially as described.

Signed at Columbus, Ohio, this 13th day of September, 1911.

HUGH EWING.

Witnesses:
J. M. HOWARD,
A. B. COOK.

Copies of this patent may be obtained for five cents each, by addressing the "Commissioner of Patents, Washington, D. C."